United States Patent

Brink et al.

[11] Patent Number: 5,331,024
[45] Date of Patent: Jul. 19, 1994

[54] PROCESS FOR THE PREPARATION OF AN AQUEOUS DISPERSIONS OF PLASTICS HAVING A REDUCED FORMALDEHYDE CONTENT AND USE THEREOF

[75] Inventors: Gerhard Brink, Burghausen; Konran A. Wierer, Mehring, both of Fed. Rep. of Germany

[73] Assignee: Wacker-Chemie GmbH, Munich, Fed. Rep. of Germany

[21] Appl. No.: 106,319

[22] Filed: Aug. 13, 1993

Related U.S. Application Data

[63] Continuation of Ser. No. 809,709, Dec. 17, 1991, abandoned.

[30] Foreign Application Priority Data

Dec. 20, 1990 [DE] Fed. Rep. of Germany ....... 4040959

[51] Int. Cl.$^5$ .......................... C08K 9/00; C08F 6/00;
C08F 8/00; C08L 33/00
[52] U.S. Cl. ..................... 523/200; 524/555;
524/816; 524/831; 525/194; 525/197;
525/326.1; 525/337; 525/340; 525/345;
525/387; 526/227; 528/487; 528/491;
427/385.5
[58] Field of Search .............. 524/392, 393, 394, 395,
524/502, 533, 555, 816, 831; 427/385.5;
526/227; 523/200; 525/184, 197, 326.1, 337,
345, 340, 387; 528/487, 489, 491

[56] References Cited

U.S. PATENT DOCUMENTS

| | | | |
|---|---|---|---|
| 3,457,209 | 7/1969 | Mikofalvy | 524/533 |
| 3,714,096 | 9/1970 | Biale | 524/166 |
| 3,974,117 | 10/1974 | Illmann et al. | 524/824 |
| 3,983,057 | 10/1974 | Illmann et al. | 524/824 |
| 4,021,397 | 5/1977 | Shah | 524/419 |
| 4,246,156 | 7/1979 | Heins et al. | 524/460 |
| 4,267,094 | 5/1981 | Huhn et al. | 524/533 |
| 4,289,674 | 9/1981 | Christenson et al. | 523/100 |
| 4,289,676 | 9/1981 | Czauderna et al. | 524/555 |
| 4,403,058 | 9/1983 | Dohi et al. | 524/394 |
| 4,473,678 | 9/1984 | Flink et al. | 524/211 |
| 4,735,851 | 7/1986 | Dodson et al. | 428/326 |
| 5,139,882 | 8/1992 | Elser et al. | 428/522 |

FOREIGN PATENT DOCUMENTS

| | | |
|---|---|---|
| 3160884 | 2/1985 | Australia . |
| 0007043 | 6/1979 | European Pat. Off. . |
| 0019169 | 5/1980 | European Pat. Off. . |
| 0080635 | 11/1982 | European Pat. Off. . |
| 2354680 | 11/1973 | France . |
| 2354681 | 11/1973 | France . |
| 3328456 | 8/1983 | France . |
| 3902555 | 1/1989 | France . |

OTHER PUBLICATIONS

Derwent Abstract 20141W/12, Shinetsu Chem Ind Co. Ltd.
C.A. 88(6): 38707r.

*Primary Examiner*—Paul R. Michl
*Assistant Examiner*—Tae H. Yoon
*Attorney, Agent, or Firm*—Burgess, Ryan & Wayne

[57] ABSTRACT

The invention relates to aqueous dispersions of plastics having a solids content of 30 to 70% by weight and a reduced formaldehyde content, based on polymers of one or more monomers from the group comprising acrylic acid esters, methacrylic acid esters, vinyl esters, olefins, vinyl halides, vinylaromatics and ethylenically unsaturated carboxylic acids and amides thereof, and a content of 0 to 10% by weight, based on the total weight of the polymer, of N-alkylamides and/or N-alkoxyalkylamides of ethylenically unsaturated carboxylic acids, wherein the dispersion contains 0.05 to 10% by weight, based on the polymer, of one or more peroxy compounds from the group comprising hydrogen peroxide, organic peroxides, perborates, percarbonates, persulfates and perphosphates. The dispersions of plastics modified according to the invention are suitable for use as binders, coating agents, impregnating agents and adhesives in all fields in which a low formaldehyde content or a reduced release of formaldehyde during processing is required.

7 Claims, No Drawings

PROCESS FOR THE PREPARATION OF AN AQUEOUS DISPERSIONS OF PLASTICS HAVING A REDUCED FORMALDEHYDE CONTENT AND USE THEREOF

This application is a continuation of application Ser. No. 809,709, filed Dec. 17, 1991 now abandoned.

BACKGROUND OF THE INVENTION

1) Field of the Invention

The invention relates to aqueous dispersions of plastics which have a reduced formaldehyde content and contain one or more peroxy compounds from the group comprising peroxides, perborates, percarbonates, persulfates and perphosphates for reduction of the content of free formaldehyde.

2) Background of the Invention

Aqueous dispersions which are self-crosslinking if appropriate and are based on synthetic resins are used to bond nonwovens, which are mainly used in the medical or hygiene sector. The base polymer usually consists of homo- or copolymers of acrylic acid esters or methacrylic acid esters, vinyl acetate homopolymers or vinyl acetate-ethylene copolymers, as well as polymers based on styrene-butadiene or vinyl chloride, if appropriate with a content of self-crosslinking comonomers. The crosslinking which proceeds during the drying operation on self-crosslinking polymers causes an increase in wet and dry strength of the nonwovens under mechanical stress and improves the resistance of the nonwovens to cleaning with water and solvents.

The crosslinking agents employed in practice are mainly monomers containing N-methylol groups, such as N-methylol derivatives of unsaturated organic acid amides (N-methylol-acrylamide) or esters thereof (N-(isobutoxymethyl)acrylamide). N-Methylol compounds split off formaldehyde in an aqueous medium. When these compounds are used as crosslinking agents in an aqueous medium, free formaldehyde is split off above all during drying, because of the condensation reaction. The free formaldehyde thus formed is still contained in the nonwoven even after intensive drying.

The redox catalysts employed during the polymerization, for example Bruggolit or Rongalit (alkali metal formaldehyde sulfoxylates), which also release formaldehyde in an aqueous medium, are another source of free formaldehyde in aqueous synthetic resin dispersions.

Because of the toxicological objections to formaldehyde, which have been discussed for a relatively long time, and the stipulation that only limited formaldehyde concentrations are permitted in the finished nonwoven for nonwovens in the medical and hygiene sector, there exists the need to provide dispersions of plastics having a reduced formaldehyde content as binders for nonwovens.

DE-A1 33 28 456 (EP-A1 143 175) claims formaldehyde-free, crosslinkable polymer systems having crosslinking components based on N-methylol amide and/or N-methylol ether-amide groups. The reduction in formaldehyde content is achieved by addition of a formaldehyde acceptor based on cyclic ureas, such as, for example, ethyleneurea, which bonds the free formaldehyde formed. The disadvantage of this procedure is that specifically the wet strength values of the bonded nonwovens are reduced by the addition of water-soluble organic substances, and formaldehyde is still present, although in bonded form, and can be released, for example, under exposure to heat.

A path analogous to that of DE-A1 33 28 456 with the disadvantages just mentioned is taken in EP-B1 80 635. In this case, urea is added to the dispersion as a formaldehyde scavenger.

The present invention therefore has the objective of drastically reducing the formaldehyde content in aqueous dispersions of plastics based on self-crosslinking polymers or non-crosslinking polymers, without adversely influencing the strength of substrates bonded with these dispersions and avoiding renewed release of formaldehyde during processing.

SUMMARY OF THE INVENTION

The invention relates to aqueous dispersions of plastics having a solids content of 30 to 70% by weight and based on polymers of one or more monomers from the group comprising acrylic acid esters, methacrylic acid esters, vinyl esters, olefins, vinyl halides, vinyl-aromatics and ethylenically unsaturated carboxylic acids and amides thereof, with a content of 0 to 10% by weight, based on the total weight of the polymer, of N-alkylamides and/or N-alkoxyalkylamides of ethylenically unsaturated carboxylic acids, wherein the dispersion contains 0.05 to 10.0% by weight, based on the polymer, of one or more peroxy compounds from the group comprising hydrogen peroxide, organic peroxides, perborates, percarbonates, persulfates and perphosphates.

DESCRIPTION OF THE PREFERRED EMBODIMENTS

Preferred (meth)acrylic acid esters are the esters of alcohols having 1 to 10 carbon atoms, such as methyl (meth) acrylate, ethyl (meth) acrylate, propyl (meth) acrylate, butyl (meth)acrylate, 2-ethylhexyl (meth) acrylate or lauryl (meth) acrylate.

Vinyl esters which can be mentioned as being preferred are the esters of alkanecarboxylic acids having 1 to 15 C atoms, such as vinyl acetate, vinyl propionate, vinyl butyrate, vinyl 2-ethylhexanoate, vinyl laurate, Versatic acid$^R$ vinyl ester (for example VeoVa9$^R$ or VeoVa-10$^R$, vinyl esters of α-branched monocarboxylic acids having 9 and 10 C atoms respectively, commercial products from Shell) or 1-methylvinyl acetate (isopropenyl acetate).

Suitable olefins are ethylene, propylene or butadiene. Vinyl chloride or vinylidene chloride are preferably employed as the vinyl halides. Preferred vinylaromatics are styrene or vinyltoluene.

Examples of ethylenically unsaturated carboxylic acids and amides thereof are acrylic acid, methacrylic acid, itaconic acid, fumaric acid and maleic acid and monoamides and diamides thereof, in particular (meth)acrylic acid and (meth)acrylamide.

Preferred N-alkylamides and/or N-alkoxyalkylamides of ethylenically unsaturated carboxylic acids are N-methylolcrylamide, N-methylolmethacrylamide or N-(isobutoxymethyl)-acrylamide or N-(isobutoxymethyl)-methacrylamide.

Particularly suitable binders are aqueous dispersions of vinyl acetate homopolymers, vinyl acetate-ethylene copolymers, vinyl acetate-ethylene-N-methylol(meth)acrylamide terpolymers, vinyl chloride-vinyl acetate-ethylene-N-methylol(meth)acrylamide copolymers, vinyl chloride-ethylene copolymers, vinyl chlorideethylene-N-methylol(meth)acrylamide terpolymers, alkyl acrylate-N-methylol (meth)acrylamide copolymers and vinyl acetate-ethylene-acrylate copolymers or vinyl acetate-acrylate copolymers which optionally have an N-methylol(meth)acrylamide content.

Suitable peroxy compounds are compounds from the group comprising hydrogen peroxide, organic peroxides, perborates, percarbonates, persulfates and perphosphates. Water-soluble peroxy compounds are preferably employed. Examples of organic peroxides are keto-peroxides, for example acetylacetone peroxide, or hydroperoxides, such as isopropyl hydroperoxide, tert-butyl hydroperoxide and cumene hydroperoxide. Examples of perborates are sodium perborate ($NaBO_3.4H_2O$) or perborax ($Na_2B_4O_8.10H_2O$). Examples of persulfates are alkali metal and ammonium peroxosulfates, as well as alkali metal and ammonium peroxodisulfates, for example potassium persulfate. A suitable percarbonate is, for example, sodium percarbonate. Hydrogen peroxide is particularly preferred.

The peroxy compound is added to the dispersion of plastic after the polymerization has ended. The peroxy compound is preferably metered in as an aqueous solution or as an aqueous emulsion. The amount of peroxy compound depends on whether and in what amount N-alkylamides and/or N-alkoxyalkylamides of ethylenically unsaturated carboxylic acids are present in the dispersed polymer. An amount of 0.05 to 10.0% by weight, based on the polymer, of peroxy compound is in general sufficient. 0.5 to 5.0% by weight, in particular 0.5 to 2.0% by weight, is preferably employed. If appropriate, the dispersion can be adjusted to a neutral pH by addition of base, for example ammonia, after the addition of the peroxy compound.

The dispersions of plastics modified according to the invention are suitable for use as binders, coating agents, impregnating agents and adhesives in all fields in which a low formaldehyde content or a reduced release of formaldehyde during processing is required. These are, for example, the coating and gluing of paper, the finishing of textiles and the joining of wooden workpieces.

The dispersions of plastics according to the invention are particularly suitable for bonding and coating nonwovens, such as carded nonwovens, airlaid papers, wet nonwovens and spunbonded webs. As a result of the addition of the peroxy compounds, not only is the content of free formaldehyde in the dispersion reduced, the nonwovens bonded with these dispersions also have a drastically reduced content of free formaldehyde after processing. The nonwovens bonded with the dispersions according to the invention display a high wet strength, and because of the low content of free formaldehyde can also be employed in the hygiene and medical sector with their high requirements.

The following examples serve to further illustrate the invention.

EXAMPLE 1

In each case 0.0, 0.5, 1.0 or 2.0% by weight of $H_2O_2$, based on the terpolymer, was added (addition in a 47% strength aqueous solution) to an aqueous dispersion having a solids content of 47% by weight of a vinyl acetate-ethylene-N-methylolacrylamide terpolymer with a vinyl acetate content of 56% by weight, an ethylene content of 41% by weight and an N-methylolacrylamide content of 3.0% by weight.

The dispersions treated in this way were then stored for 24 hours, 2 weeks, 8 weeks or 20 weeks. After the storage time, the formaldehyde content in the aqueous phase of the dispersions was determined by the acetylacetone method. The dispersions were employed as binders for nonwovens of viscose fibers. The formaldehyde content of the nonwovens was determined by the acetylacetone method; the strength of the nonwovens (dry strength and wet strength) were determined in accordance with DIN 53857. The measurement results of Example 1 are given in Table 1.

EXAMPLE 2

0.0 or 8.0% by weight of potassium persulfate, based on the terpolymer, was added as an aqueous solution to an aqueous dispersion having a solids content of 47% by weight of a vinyl acetate-ethylene-N-methylolacrylamide terpolymer with a vinyl acetate content of 56% by weight, an ethylene content of 41% by weight and an N-methylolacrylamide content of 3.0% by weight.

The dispersions thus treated were stored for 10 weeks and used to produce nonwovens. The formaldehyde content in the nonwoven was determined by the acetylacetone method. With the untreated dispersion, the formaldehyde content in the nonwoven was 43 ppm, and with the dispersion to which potassium persulfate had been added, the formaldehyde content in the nonwoven was only 12 ppm.

EXAMPLE 3

0.0 or 2.6% by weight of tert-butyl hydroperoxide, based on the terpolymer, was added as an aqueous emulsion to an aqueous dispersion having a solids content of 47% by weight of a vinyl acetate-ethylene-N-methylolacrylamide terpolymer with a vinyl acetate content of 56% by weight, an ethylene content of 41% by weight and an N-methyiolacrylamide content of 3.0% by weight.

The dispersions thus treated were stored for 10 weeks and used to produce nonwovens. The formaldehyde content in the nonwoven was determined by the actylacetone method. With the untreated dispersion, the formaldehyde content in the nonwoven was 43 ppm, and with the dispersion to which tert-butyl hydroperoxide had been added, the formaldehyde content in the nonwoven was only 14 ppm.

EXAMPLE 4

0.0 or 4.2% by weight of sodium perborate, based on the copolymer, was added as an aqueous emulsion to an aqueous dispersion having a solids content of 50% by weight of a vinyl acetate-ethylene-N-methylolacrylamide copolymer with a vinyl acetate content of 66% by weight, an ethylene content of 26% by weight and an N-methylolacrylamide content of 4.0% by weight.

The dispersions thus treated were stored for 10 weeks and used to produce nonwovens. The formaldehyde content in the nonwoven was determined by the acetylacetone method. With the untreated dispersion, the formaldehyde content in the nonwoven was 54 ppm, and with the dispersion to which sodium perborate had been added, the formaldehyde content in the nonwoven was only 11 ppm.

EXAMPLE 5

0.0 or 1.0% by weight of hydrogen peroxide, based on the terpolymer, was added as an aqueous solution to an aqueous dispersion having a solids content of 45% by weight of a vinyl acetate-butyl acrylate-N-methylolacrylamide terpolymer with a vinyl acetate content of 62% by weight, a butyl acrylate content of 35% by weight and an N-methylolacrylamide content of 3.0% by weight.

The dispersions thus treated were stored for 10 weeks and used to produce nonwovens. After the storage time, the formaldehyde content in the aqueous phase of the dispersions and in the nonwovens was determined by the acetylacetone method. In the untreated dispersion, the formaldehyde content was 310 ppm, and in the dispersion to which hydrogen peroxide had been added, the formaldehyde content was only 261 ppm. In the nonwoven produced with the untreated dispersion, the formaldehyde content was 50 ppm, and in the nonwoven bonded with the treated dispersion, it was only 15 ppm.

EXAMPLE 6

0.0 or 1.0% by weight of hydrogen peroxide, based on the copolymer, was added as an aqueous solution to an aqueous dispersion, prepared in the presence of a redox initiator system containing Brüggolit, having a solids content of 55% by weight of a vinyl acetate-ethylene copolymer with a vinyl acetate content of 82% by weight and an ethylene content of 18% by weight.

The dispersions thus treated were stored for 10 weeks and used to produce nonwovens. After the storage time, the formaldehyde content in the aqueous phase of the dispersions and in the nonwovens was determined by the acetylacetone method. In the untreated dispersion, the formaldehyde content was 340 ppm, and in the dispersion to which hydrogen peroxide had been added, the formaldehyde content was only 49 ppm. In the nonwoven produced with the untreated dispersion, the formaldehyde content was 50 ppm, and in the nonwoven bonded with the treated dispersion, it was only 12 ppm.

Methods for the Production of the Nonwovens, for the Determination of the Formaldehyde Content and for the Determination of the Mechanical Strength of the Non-wovens

Production of the Nonwovens

To produce the nonwovens, a nonwoven of viscose fibers (3.1 dtex, 60 mm long) was produced via a carding machine, crosslapper and needling machine. The dispersions were in each case applied in an amount of 30% by weight, based on the weight of the nonwoven, by full bath impregnation and slop padding and were dried in a screen drum dryer at 150° C. for three minutes. After the nonwoven weighing about 60 g/cm$^3$ had been climatically controlled at 22° C. and 55% atmospheric humidity, the formaldehyde content was determined by the acetylacetone method and the strength of the nonwoven (dry strength and wet strength) was determined in accordance with DIN 53857.

Determination of the Formaldehyde Content by the Acetylacetone Method

In the Aqueous Phase of the Dispersion

The dispersion was diluted 1:1 with distilled water and the polymer particles were centrifuged off in an ultracentrifuge. The clear supernatant was taken off, diluted and used for the formaldehyde determination by the acetylacetone method.

In the Nonwoven 2.5 g of the nonwoven were comminuted and swirled for 60 minutes at 40° C. in a measuring flask containing 100 ml of distilled water, and the mixture was then filtered. The filtrate was used for the formaldehyde determination by the acetylacetone, method.

Acetylacetone Method

The acetylacetone reagent consisted of a mixture of 150 g of ammonium acetate, 3 ml of glacial acetic acid and 2 ml of acetylacetone, which was diluted to 1000 ml with distilled water. 5 ml of acetylacetone reagent were added to 1 ml of the diluted supernatant from the working up of the dispersion or 5 ml of the filtrate from the working up of the nonwoven, the mixture was shaken for 30 minutes at 50° C. or 40° C. respectively in a waterbath and left to stand at room temperature for 30 minutes and the formaldehyde concentration was determined by UV spectrophotometry.

Determination of the Dry and Wet Strength of Nonwovens in Accordance with DIN 53847 (Tensile Strength and Elongation)

Before the measurement, the nonwovens were exposed to a standard atmosphere (air temperature 22° C., relative atmospheric humidity 55%). To determine the wet strength, the nonwovens were kept in distilled water for a further minute. In each case 10 test strips (100 mm in length, 15 mm in width) were taken from the climatically controlled nonwovens, five of them at right angles to and five of them along the production direction. The tensile strength (TS) and the elongation at break of the nonwoven were determined on a tensile tester and the mean of the ten individual tests was calculated in each case.

TABLE 1

| Dispersion | | Nonwoven (dry) | | | Nonwoven (wet) | | Formaldehyde content | |
| --- | --- | --- | --- | --- | --- | --- | --- | --- |
| H$_2$O$_2$ content [%] | Storage time | TS [N] | Elongation [%] | Weight [g/m$^2$] | TS [N] | Elongation [%] | Dispersion [ppm] | Nonwoven [ppm] |
| 0.0 | 24 hours | 13.35 | 16.00 | 52.5 | 8.14 | 20.90 | 764 | 37 |
| 0.5 | 24 hours | 14.39 | 21.60 | 58.2 | 9.49 | 24.15 | 643 | 21 |
| 1.0 | 24 hours | 13.06 | 16.95 | 54.0 | 10.25 | 11.00 | 619 | 17 |
| 2.0 | 24 hours | 13.66 | 19.00 | 55.0 | 8.55 | 21.75 | 533 | 15 |
| 0.0 | 2 weeks | 13.15 | 14.55 | 56.3 | 8.89 | 22.15 | 795 | 40 |
| 0.5 | 2 weeks | 12.24 | 15.10 | 51.5 | 7.31 | 21.20 | 524 | 13 |
| 1.0 | 2 weeks | 12.17 | 15.00 | 52.8 | 6.77 | 20.00 | 523 | 13 |
| 2.0 | 2 weeks | 12.68 | 15.40 | 52.0 | 7.44 | 20.65 | 483 | 13 |
| 0.0 | 8 weeks | 14.20 | 16.65 | 53.90 | 8.80 | 20.70 | 799 | 45 |
| 0.5 | 8 weeks | 12.09 | 19.70 | | | | 285 | 9 |
| 1.0 | 8 weeks | 12.01 | 17.35 | 53.30 | 7.77 | 21.60 | 367 | 12 |
| 2.0 | 8 weeks | 10.60 | 19.10 | | | | 357 | 9 |
| 0.0 | 20 weeks | 13.26 | 19.70 | 55.10 | 7.46 | 21.30 | 856 | 43 |
| 0.5 | 20 weeks | 11.14 | 21.15 | 54.30 | 6.90 | 22.15 | 221 | 16 |
| 1.0 | 20 weeks | 11.61 | 19.80 | 50.90 | 7.23 | 21.80 | 196 | 7 |

TABLE 1-continued

| Dispersion | | Nonwoven (dry) | | | Nonwoven (wet) | | Formaldehyde content | |
|---|---|---|---|---|---|---|---|---|
| $H_2O_2$ content [%] | Storage time | TS [N] | Elongation [%] | Weight [g/m$^2$] | TS [N] | Elongation [%] | Dispersion [ppm] | Nonwoven [ppm] |
| 2.0 | 20 weeks | 9.02 | 20.35 | 52.20 | 7.09 | 21.30 | 247 | 9 |

What is claimed is:

1. A process for the preparation of an aqueous dispersion of a plastic having a solids content of 30 to 70% by weight, a reduced formaldehyde content, and which avoids the addition of any urea which comprises adding after polymerization has ended, 0.05 to 10.0% by weight, based on the polymer, of which said plastic is comprised, at least one peroxy compound selected from the group consisting of hydrogen peroxide, organic peroxides, perborates, percarbonates, persulfates and perphosphates, to an aqueous dispersion containing said polymer and wherein said polymer was prepared from at least one monomer selected from the group consisting of acrylic acid esters, methacrylic acid esters, vinyl esters, olefins, vinyl halides, vinylaromatics and ethylenically unsaturated carboxylic acids and amides thereof, and a cross-linking agent containing N-methylol groups, said cross-linking agent being present in said polymer in an amount not exceeding 10% by weight based on the total weight of the polymer.

2. The process as claimed in claim 1, wherein the peroxy compound is added in an aqueous solution or emulsion.

3. A process for bonding and coating a nonwoven which comprises bonding and coating said nonwoven with a dispersion of a plastic prepared by the process as claimed in claim 1.

4. A process which requires the use of a binder, the improvement which comprises using as said binder a dispersion of a plastic prepared by the process as claimed in claim 1.

5. A process which requires the use of a coating agent, the improvement which comprises using as said coating agent a dispersion of a plastic prepared by the process as claimed in claim 1.

6. A process which requires the use of an impregnating agent, the improvement which comprises using as said impregnating agent a dispersion of a plastic prepared by the process as claimed in claim 1.

7. A process which requires the use of an adhesive, the improvement which comprises using as said adhesive a dispersion of a plastic prepared by the process as claimed in claim 1.

* * * * *

UNITED STATES PATENT AND TRADEMARK OFFICE
CERTIFICATE OF CORRECTION

PATENT NO. : 5,331,024
DATED : July 19, 1994
INVENTOR(S) : Gerhard Brink et al.

It is certified that error appears in the above-indentified patent and that said Letters Patent is hereby corrected as shown below:

On the title page:
In Item 75: change "Konran A. Wierer" to --Konrad A. Wierer--

Signed and Sealed this

Seventh Day of February, 1995

Attest:

BRUCE LEHMAN

Attesting Officer

Commissioner of Patents and Trademarks